United States Patent
Wu et al.

(10) Patent No.: US 8,432,361 B2
(45) Date of Patent: Apr. 30, 2013

(54) COMPUTER MOUSE

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 200 days.

(21) Appl. No.: 12/842,153

(22) Filed: Jul. 23, 2010

(65) Prior Publication Data

US 2011/0291931 A1 Dec. 1, 2011

(30) Foreign Application Priority Data

May 28, 2010 (CN) .......................... 2010 1 0185706

(51) Int. Cl.
*G06F 3/033* (2006.01)
(52) U.S. Cl.
USPC ........... 345/166; 345/163; 345/164; 345/165; 345/167; 345/168; 345/169
(58) Field of Classification Search ........... 345/163–167
See application file for complete search history.

(56) References Cited

U.S. PATENT DOCUMENTS

| 4,917,648 A * | 4/1990 | Hartje ........................... 446/424 |
| 2008/0220692 A1* | 9/2008 | Torres et al. .................. 446/435 |
| 2008/0243308 A1* | 10/2008 | Trzecieski .................... 700/258 |
| 2009/0179856 A1* | 7/2009 | Scott ............................. 345/157 |

FOREIGN PATENT DOCUMENTS

JP        60055430 A   *  3/1985

* cited by examiner

*Primary Examiner* — Alexander S Beck
*Assistant Examiner* — Amen Bogale
(74) *Attorney, Agent, or Firm* — Altis Law Group, Inc.

(57) ABSTRACT

A computer mouse includes a driver module, a plurality of wheels, a control module, and a plurality of sensors. The control module is electrically connected to the driver module and the sensors, and is capable of controlling the driver module to drive the wheels. The driver module is capable of providing driving force and driving the wheels. The sensors are capable of sensing movement information of the computer mouse, and the control module controls the driver module to adjust the movement state of the wheels according to the movement information. Thus, the sensors can accurately sense and obtain the movement information to prevent the computer mouse from falling from a support plane.

18 Claims, 2 Drawing Sheets

COMPUTER MOUSE

BACKGROUND

1. Technical Field

The disclosure generally relates to peripherals of computers, more particularly relates, to a computer mouse used for the computer.

2. Description of the Related Art

Mouse, as an information input device, is widely used to transmit commands to a computer. In use, a user may need to manually operate the mouse to control the computer, which may cause fatigue after long operation by the user. An existing remote controlled mouse usually includes a housing, a motor, and wheels. The motor and the wheels are mounted within the housing. Thus, by operating a remote control, the user can control the movement of the mouse on a worktable without manually operating the mouse.

However, when the mouse moves to the edge(s) of the worktable, it may fall down off the desktop due to misoperation or inertia and accordingly be damaged.

Therefore, there is room for improvement within the art.

BRIEF DESCRIPTION OF THE DRAWINGS

Many aspects of an exemplary computer mouse can be better understood with reference to the following drawings. The components in the drawings are not necessarily drawn to scale, the emphasis instead being placed upon clearly illustrating the principles of the exemplary computer mouse. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
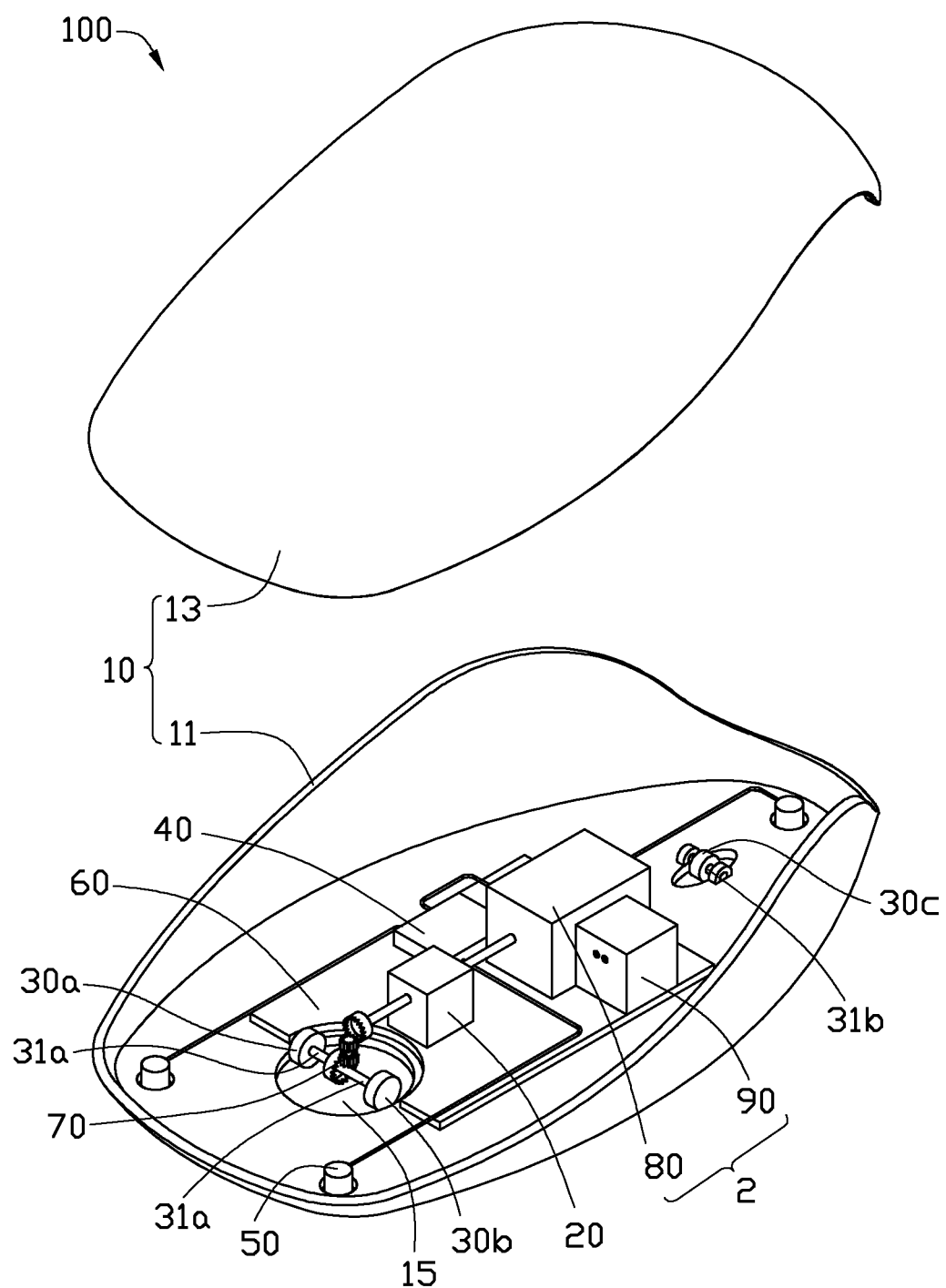
FIG. 1 is a partially exploded view of a computer mouse, according to an exemplary embodiment.

FIG. 1 shows an exemplary embodiment of a computer mouse 100 for controlling an electronic device, such as a computer. The computer mouse 100 may be a wireless mouse and includes a main body 10, a driver module 20, wheels 30a, 30b, and 30c, a control module 40, a plurality of sensors 50, and a circuit board 60. In detail, the control module 40 is electrically connected to the driver module 20 and the sensors 50. The driver module 20, the control module 40, and the circuit board 60 are mounted within the main body 10, and the control module 40 and the driver module 20 are mounted on and are electrically connected to the circuit board 60.

The main body 10 includes a first cover 11 and a second cover 13 detachably covered on the first cover 11. The first cover 11 defines a plurality of through holes 15 at the bottom surface of the first cover 11. Each through hole 15 accommodates a corresponding wheel 30a, 30b or 30c. The circuit board 60 is detachably mounted within the first cover 11 and is substantially adjacent to the through holes 15. Thus, the wheels 30a, 30b, and 30c can pass partially through the corresponding through holes 15 and are exposed from the bottom surface of the first cover 11.

The wheel 30a and the wheel 30b are mounted on an axle 31a and are exposed from the through hole 15, and the opposite ends of the axle 31a are detachably and rotatably mounted within an end of the first cover. The wheel 30c is rotatably mounted on another axle 31b, and the opposite ends of the axle 31b are detachably and/or rotatably mounted within the other end of the first cover 11. The computer mouse 100 further includes a gear module, the gear module includes a plurality of gears 70, and the gears 70 engage with each other to cooperatively drive the wheel 30a and the wheel 30b.

Figure 2:
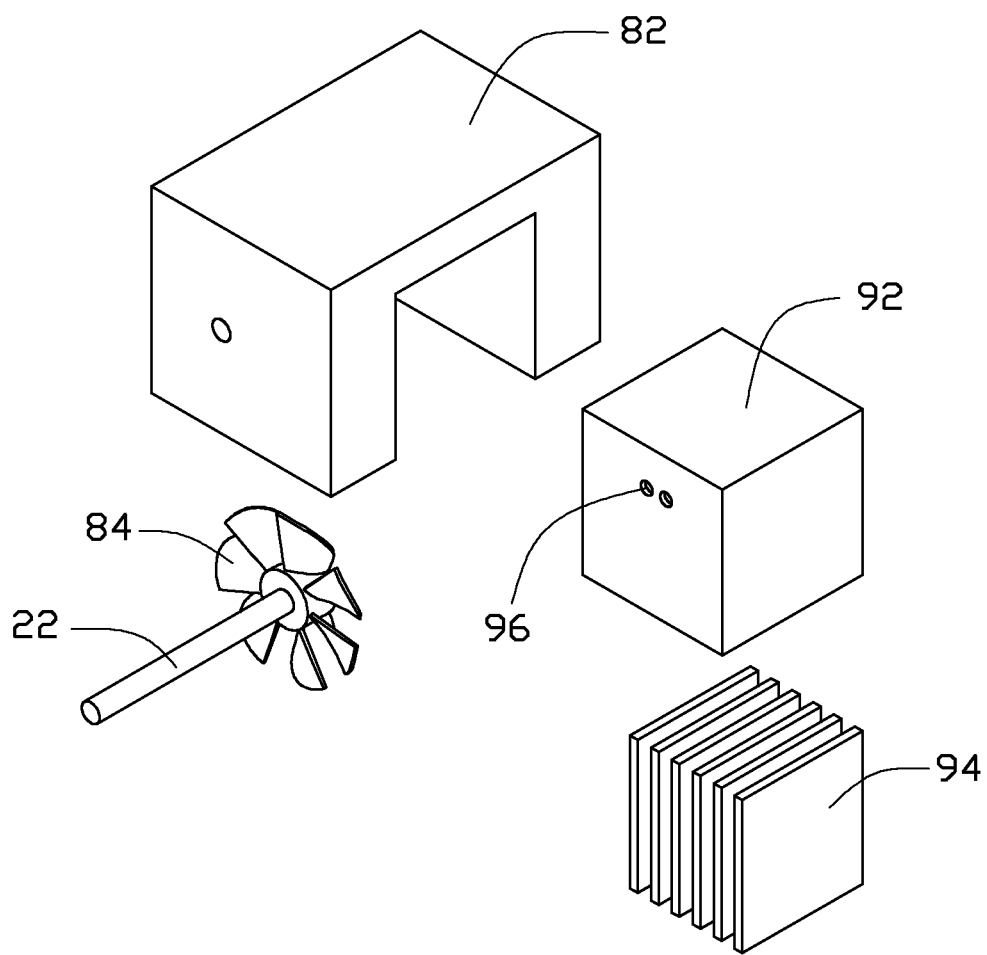
FIG. 2 is an enlarged and exploded view of a cleaning device of the computer mouse shown in FIG. 1.

Referring to FIG. 2, the driver module 20 can be an electric motor and includes a shaft 22 connected to one gear 70. The driver module 20 is capable of providing driving force to the gears 70 by the shaft 22 to drive the movement of the axle 31a and the wheels 30a and 30b. The control module 40 can be a controller and is capable of controlling the driver module 20 to adjust rotational speed and rotation direction of the wheels 30a and 30b. In practical use, the computer mouse 100 may have four wheels, accordingly two of which are mounted on opposite ends of the axle 31a, and other two wheels are mounted on opposite ends of the other axle 31b.

The sensors 50 may be optical sensors and are located at any edge or adjacent any edge of the first cover 11. The sensors 50 are for sensing movement information of the computer mouse 100, and transmit the sensed signals to the control module 40. Therefore, the control module 40 transmits a corresponding command signal to the driver module 20 and controls the driver module 20 to adjust the rotational speed and the rotation direction of the wheels 30a and 30b according to the command signal. In practical use, the computer mouse 100 can have three sensors 50, two sensors 50 are adjacent to the wheel 30a and the wheel 30b and are mounted within the bottom of the first cover 11, and another sensor 50 is located at another end of the first cover 11.

The sensors 50 radiate continuous sensing light to the desktop or other plane and then receive reflected light from different reflected surfaces of the desktop or the plane. Thus, the sensors 50 can record transmission time of the reflected light, and the control module 40 can calculate the distance between the reflected surfaces and the sensors 50 to obtain the movement information of the computer mouse 100. For example, when the computer mouse 100 moves to any one edge of the support plane, one or more of the sensors 50 sense the movement information of the computer mouse 100 and transmit the sensed signals to the control module 40. The control module 40 controls the driver module 20 to adjust rotational speed and rotation direction of the wheel 30a and the wheel 30b. In addition, the control module 40 can control the driver module 20 to drive the wheels 30a, 30b and 30c to move back or forth.

Further referring to FIG. 2, the computer mouse 100 further includes a cleaning device 2 mounted within the main body 10. The cleaning device 2 can suck and accordingly clean dust on the movement path of the computer mouse 100. The cleaning device 2 includes a cleaner 80 and a dust filter 90. The driver module 20 is connected to the cleaner 80 by the shaft 22 and provides driving force to the cleaner 80. The cleaner 80 includes a substantially rectangular housing 82 and a rotating member 84 mounted within the housing 82. The housing 82 defines an opening (not labeled), which is opened toward and is communicated with the surface of the support plane. The rotating member 84 is connected to the shaft 22 and rotates together with the shaft 22.

The dust filter 90 include a base member 92 and a plurality of filters 94 mounted within the base member 92. One sidewall of the base member 92 defines two ventholes 96. The base member 92 is communicated with the housing 82, and the filters 94 are capable of filtering the dust from the housing 82. Therefore, the driver module 20 forces the rotating member 84 to rotate by the shaft 22; the cleaner 80 sucks the air through the opening from the movement path of the support plane, and the pluralities of filters 94 filter the dust from the cleaner 80, and the clean air is exhausted from the ventholes 96.

In addition, the computer mouse 100 can further include at least one alarm mounted within the main body 10. The alarm is electrically connected to the control module 40. When the computer mouse 100 moves to the prohibited area or the dangerous area, such as the edge(s) of the support plane, the control module 40 transmits the command signal to the alarm to output a warning signal.

In summary, the sensors 50 of the computer mouse 100 can accurately sense and obtain the movement information to prevent the computer mouse 100 from falling from the desktop. Thus, when the computer mouse 100 moves close to any edge of the support plane, the sensors 50 transmit the sensed signals to the control module 40, and the control module 40 transmits a corresponding command signal and controls the driver module 20 to adjust the movement state of the wheels 30a and 30b automatically, to avoid damage to the computer mouse 100.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A computer mouse, comprising:
   a gear module;
   a driver module for providing driving force, the driver module including a shaft connected to the gear module;
   a plurality of wheels mounted on an axle engaged with the gear module, the driver module providing a driving force to the gear module by the shaft to drive the movement of the axle and the plurality of wheels;
   a control module electrically connected to the driver module, the control module for controlling the driver module to drive the plurality of wheels;
   a plurality of sensors electrically connected to the control module; and
   a cleaner comprising a housing and a rotating member mounted within the housing, the rotating member connected to the shaft of the driver module and rotating together with the shaft forced by the driver module to suck dust;
   wherein the sensors are capable of sensing movement information of the computer mouse, and the control module controls the driver module to adjust the movement state of the plurality of wheels according to the movement information.

2. The computer mouse as claimed in claim 1, further comprising a main body, wherein the main body comprises a first cover and a second cover detachably assembled to the first cover, a bottom surface of the first cover defines a plurality of through holes, and the plurality of wheels partially pass through the corresponding through holes and expose from the bottom surface of the first cover.

3. The computer mouse as claimed in claim 2, wherein the axle is mounted within the first cover, two of the plurality of wheels are mounted on the axle and expose from the through hole, the opposite ends of the axle are detachably and rotatably mounted within the first cover.

4. The computer mouse as claimed in claim 3, wherein the gear module comprises a plurality of gears, one gear is connected to the shaft, and the driver module provides the driving force to the plurality of gears, the plurality of gears engage with each other to drive the axle and the two wheels mounted on the axle.

5. The computer mouse as claimed in claim 2, wherein the sensors are optical sensors and are located at any edge or adjacent any one edge of the first cover, and the sensors are exposed from the bottom surface of the first cove to radiate sensing light.

6. The computer mouse as claimed in claim 5, wherein the sensors radiate the sensing light to a support plane and receive reflected light, the sensors record transmission time of the reflected light, and the control module calculates the distance between the reflected surfaces and the sensors according to the transmission time to obtain the movement information of the computer mouse.

7. The computer mouse as claimed in claim 1, further comprising a dust filter, wherein the dust filter comprise a base member and a plurality of filters mounted within the base member, the base member defines two ventholes and is communicated with the housing, the filters are capable of filtering dust from the housing and exhausting air from the ventholes.

8. The computer mouse as claimed in claim 1, wherein the computer mouse is a wireless mouse.

9. The computer mouse as claimed in claim 3, wherein the computer mouse comprises three wheels, two of the wheels are mounted on the axle engaged with the gear module, one wheel is mounted on another axle detachably and rotatably mounted within the first cover, the axle and the other axle are parallel and are spaced by the cleaner and the driver module.

10. A computer mouse, comprising:
    a gear module;
    a main body;
    wheels partially mounted within the main body;
    a driver module mounted within the main body, the driver module for providing driving force to drive the wheels to move or change movement state on a support plane, the driver module including a shaft connected to the gear module;
    a control module mounted within the main body and electrically connected to the driver module, the control module for controlling the driver module to adjust the movement state of the wheels;
    a plurality of sensors mounted within the main body and electrically connected to the control module; and
    a cleaner comprising a housing and a rotating member mounted within the housing, the rotating member connected to the shaft of the driver module and rotating together with the shaft forced by the driver module to suck dust;
    wherein the wheels are mounted on an axle engaged with the gear module, the driver module provides driving force to the gear module by the shaft to drive the movement of the axle and the wheels; the sensors are capable of sensing movement information of the computer mouse, when any wheel moves to the edge(s) of the support plane, the control module transmits a corresponding command signal according to the movement signal and control the driver module to adjust the movement state of the wheels.

11. The computer mouse as claimed in claim 10, wherein the main body comprises a first cover and a second cover detachably assembled to the first cover, a bottom surface of the first cover defines a plurality of through holes, and the wheels partially pass through the corresponding through holes and expose from the bottom surface of the first cover.

12. The computer mouse as claimed in claim 11, wherein the the axle is rotatably and detachably mounted within the first cover, two wheels are mounted on the axle and expose from the through hole.

13. The computer mouse as claimed in claim 12, wherein the gear module comprises a plurality of gears, one gear is connected to the shaft, and the driver module provides a driving force to the plurality of gears, the plurality of gears engage with each other to drive the axle and the wheels mounted on the axle cooperatively.

14. The computer mouse as claimed in claim 11, wherein the sensors are optical sensors and are located at the edge(s) or adjacent the edge(s) of the first cover, and the sensors expose the bottom surface of the first cove to radiate sensing light.

15. The computer mouse as claimed in claim 14, wherein the sensors radiate the sensing light to the support plane and receive reflected light, the sensors record transmission time of the reflected light, and the control module calculates the distance between the reflected surfaces and the sensors according to the transmission time to obtain the movement information of the computer mouse.

16. The computer mouse as claimed in claim 10, further comprising a dust filter, wherein the dust filter comprise a base member and a plurality of filters mounted within the base member, the base member defines two ventholes and is communicated with the housing, the filters are capable of filtering dust from the housing and exhausting air from the ventholes.

17. The computer mouse as claimed in claim 10, wherein the computer mouse is a wireless mouse.

18. The computer mouse as claimed in claim 12, wherein the computer mouse comprises three wheels, two of the wheels are mounted on the axle engaged with the gear module, one wheel is mounted on another axle detachably and rotatably mounted within the first cover, the axle and the other axle are parallel and are spaced by the cleaner and the driver module.

* * * * *